United States Patent [19]
Coleman, Jr.

[11] 3,787,318

[45] Jan. 22, 1974

[54] SOLIDS-LIQUID SEPARATOR

[75] Inventor: John R. Coleman, Jr., Burghausen, Germany

[73] Assignee: Marathon Oil Company, Findlay, Ohio

[22] Filed: Apr. 20, 1972

[21] Appl. No.: 246,036

[52] U.S. Cl.............. 210/65, 210/456, 210/474, 210/498
[51] Int. Cl............................................ B01d 39/10
[58] Field of Search....... 210/65, 66, 163, 166, 167, 210/152, 256, 314, 316, 455, 456, 474, 498; 209/240, 254, 255, 260, 268, 273, 393

[56] References Cited
UNITED STATES PATENTS
| | | | |
|---|---|---|---|
| 678,857 | 7/1901 | Betzold | 210/314 X |
| 2,370,717 | 3/1945 | Christman, Jr. | 209/255 X |
| 3,545,618 | 12/1970 | Greg | 210/167 |
| 3,572,505 | 3/1971 | Jongbleed | 209/240 |
| 3,353,674 | 11/1967 | Leeman | 209/240 |

Primary Examiner—John Adee
Attorney, Agent, or Firm—Joseph C. Herring et al.

[57] ABSTRACT

Wet lumps of solid, together with free liquid, e.g., coke from a coke drum, fall onto a sloped deflector formed of parallel spaced angle irons or bars. The solids bounce off the deflector onto a storage plow while the free liquid, together with liquids shaken from the solids, run downward between the spaced angle irons or bars.

6 Claims, 5 Drawing Figures

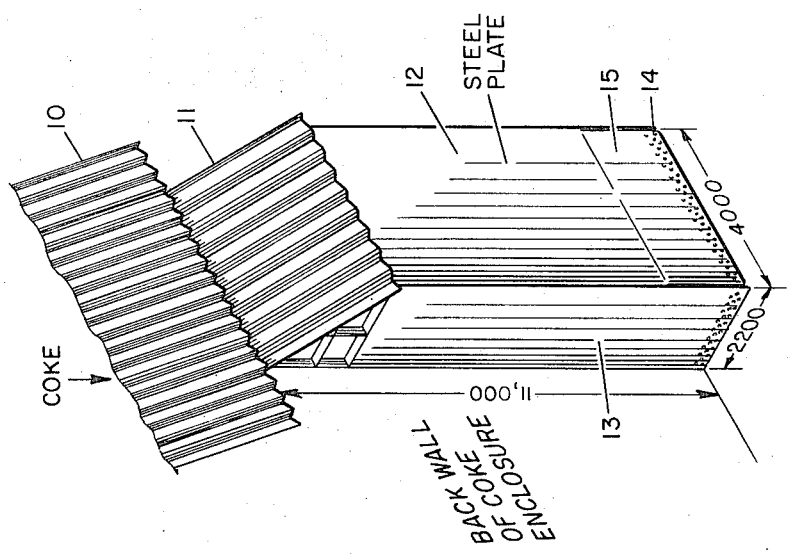
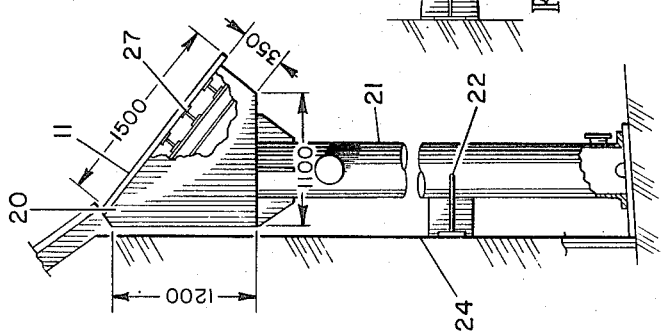
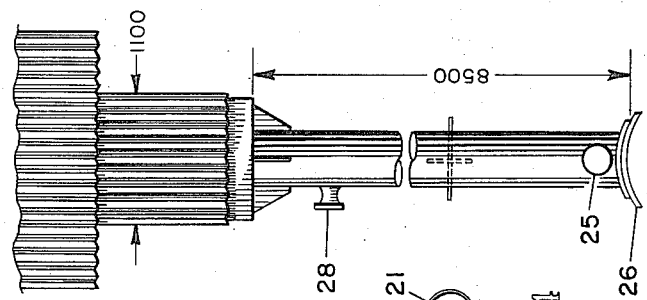
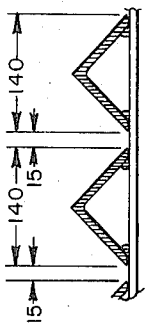
ALL DIMENSIONS IN MILLIMETERS

SOLIDS-LIQUID SEPARATOR

BACKGROUND OF THE INVENTION

1. Field of the Invention

The present invention relates generally to the following field: Conveyors, Chutes, Skids, Guides and Ways, U.S. Pat. Office Class 193, subclass 11; classifying, separating and assorting solids, classified in Class 209, subclasses 268, 273, and 393 and liquid purification or separation classified in Class 210, subclasses 65 and 499.

2. Description of the Prior Art

U. S. Pat. No. 565,151 teaches washing of gravel to remove gold. Gravel particles slide from one chute to another, dropping between the chutes and being subjected to wash water. Portions of the chutes are made of parallel bars. The concussion of dropping is used to break up particles rather than to remove water from the particles.

U. S. Pat. No. 3,087,618 uses a vibrating chute having spaced angle irons arranged in chevron-relationship to permit separation of fine particles from larger particles.

U. S. Pat. No. 2,370,717 utilizes a grill of angle irons through which gravel can pass while flat stones slide down the inclined grill.

Less relevant prior art includes U.S. Pat. Nos. 819,899; 2,812,859; 2,690,265; and 1,980,712.

None of the above prior art shows the feature of separating water from particulate solids by dropping the solids so that they impact on an inclined deflector composed of parallel, longitudinally running bars with spaces between to permit exit of water.

SUMMARY OF THE INVENTION

General Statement of the Invention

The present invention deliberately impacts wet solid particles, together with free liquids, against a deflector causing them to arc through the air into a storage pile. Under such circumstances, the free water (unlike the solids) does not rebound and thus separates from the solids. Also, the impact shakes loose excess water, while the arcing at relatively high velocity causes evaporation of additional water, particularly where the particles are hot. In preferred embodiments, the invention works entirely on the conversion of potential energy into kinetic energy, using apparatus without any moving parts and without any need for energy input from external sources.

While the invention is adaptable for a wide variety of liquid-solid separation applications, it is particularly preferred for the removal of water from hot coke. Petroleum coke formed by the delayed coking process in large coke drums is conventionally cut from the drums by the use of high pressure water jets. The resulting coke lumps falling from the bottom outlet of the coke drum are thoroughly wet and are accompanied by substantial flow of water. The present invention first separates the flow of water which moves between the spaced parallel bars, then shakes substantial quantities of water from the coke particles by means of the impact of the coke particles against the bars, and lastly arcs the coke particles through the air causing additional drying by evaporation.

Fine solid particles may flow through the bars with the water and the water can then be conventionally separated from the fine particles desired, e.g., by cyclone, settling baffles, or tanks, clarifiers or drain boxes.

UTILITY OF THE INVENTION

While the present invention is most preferred for use with delayed coke, it is useful for a wide variety of solid-liquid separation applications, including the drying of washed gravel, limestone-water separation, removal of solid particles from slurries in which they are entrained for pipelining, e.g., cold water, shale oil-crude oil, etc.

BRIEF DESCRIPTION OF THE DRAWINGS

FIG. 1 is a schematic representation of a coke drum, a conventional chute and the chute of the present invention.

FIGS. 2 and 3 are, respectively, the side and front view of the chute of the present invention showing a typical support device.

FIG. 4 is a detail of the attachment of the support device shown in FIGS. 2 and 3.

FIG. 5 is a cross sectional detail of the chute of the present invention.

DESCRIPTION OF THE PREFERRED EMBODIMENTS

Apparatus

FIG. 1 shows coke falling from the elevated bottom outlet of the conventional coke drum onto a conventional chute 10 from which it falls onto a chute 11 (inclined at a lower angle to the horizontal than is chute 10) composed of angle irons mounted with their vertexes upward and spaced approximately 15 millimeters apart so as to permit water to flow between them. Some of the coke particles bounce from the chute 11 onto a coke storage pile (not shown) located in front of the apparatus shown in FIG. 1. Other pieces may slide on a chute into the coke storage pile. In any case, the coke is freed of substantial amounts of water which runs downward through the slot between the individual angle irons forming the chute 11 into a box formed by a steel plate front 12 and side walls 13. The lower portion of the box is perforated by 20 millimeter diameter holes on 75 millimeter spacing to permit water to drain from the box and to form a cake of smaller particles which can be removed by a front end loader scooping through the doorway left when door 15 is removed from the box. The rear portion of the box (not shown) is similar to the front portion except that it has a horizontal slot located 1,500 millimeters above the bottom which serves as the weir for overflow of water and except that it has no door 15.

FIG. 2 shows a chute 11 identical to that of FIG. 1 except that it is supported by a steel plate support box 20 attached to a steel column 21 which has a suitable attachment 22 (shown in FIG. 4) for attachment to an adjacent vertical wall 24 located under the delayed coke drum (not shown). A suitable outlet 28 for water and fines is provided in the upper part of column 21 with a clean-out port 25 located at the base. A suitable base 26 is provided to support the column 21 and suitable I-beam cross supports 27 are provided beneath the chute 11. Water and fines slurry go through column 21 to a clarifier or settling basin (not shown).

FIG. 5 shows the placement of the angles which form the surface of chute 11. Operation: Referring to FIG. 2, coke falls from the elevated bottom outlet of conventional coke drum (not shown), impacting on deflector 11 and bouncing or sliding onto the storage pile (not shown) located in front of the apparatus of FIG. 2. Large lumps of coke fall sequentially as they are cut loose from the body of coke within the coke drum by means of the water jets. These individual lumps strike the chute or deflector 11 and bounce (some may slide) onto the coke storage pile. Water, both shaken from the coke particles and also flowing from the bottom outlet of the coke drum, flows through the deflector carrying with it some fine particles of coke. The coke particles have a temperature up to approximately 400°F., so that some water evaporates as the lump bounces through the air. The result is a storage pile of coke having a water content of approximately 4 percent, or, substantially less than would be obtained if the coke were merely dumped from the coke drum onto the ground and then moved away by means of conventional motorized materials handling equipment, e.g., front-end loaders. Reducing the water on the surface reduces the contact time between water and coke, thus the coke on the pile retains substantial heat which causes the pile to dry further by evaporation.

Water-fines mixture passing through the deflector can be conventionally separated, e.g., by use of cyclones, settling baffles, clarifiers, or drain boxes. It should be noted that the coke is in general sufficiently strong that it does not break upon hitting the deflector.

MODIFICATIONS OF THE INVENTION

It should be understood that the invention is capable of a variety of modifications and variations which will be made apparent to those skilled in the art by a reading of the specification which are to be included within the spirit of the claims appended hereto.

For example, the slope of the deflector can be adjusted to conform to the particular geometry of the coke drum and storage pile in question. Intermediate chutes may be used as conveyors if it is not practical to locate the deflector directly under the bottom outlet of the coke drum. However, in utilizing such auxiliary chutes, it is important they they be more steep than the deflector of the present invention so that the coke will impact upon the deflector in such a manner as to cause at least some of the particles to bounce from the deflector.

Solid bars, pipe halves, pipe, or rod can be substituted for the angles shown in FIG. 5.

What is claimed is:

1. In a process for the removal of water from wet coke particles after said coke particles have been cut from a coke drum, the improvement comprising in combination permitting the coke and the water from the coke drum to fall with impact onto a deflector arranged at an angle to the horizontal and formed of parallel spaced elongated elements running along the slanted axis of said deflector, said deflector being arranged so that at least a portion of the coke bounces off the deflector onto a coke pile while at least a portion of the water runs downward between said spaced parallel elongated elements.

2. A process according to claim 1 wherein coke falls from a coke drum onto a chute which is more steeply slanted than is said deflector and wherein the coke moves from said chute to fall upon said deflector.

3. In a process for the removal of water from wet solid particles, the improvement comprising in combination permitting said wet particles to fall onto a deflector arranged at an angle to a horizontal and formed of parallel spaced elgonated elements running along the slanted axis of said deflector, said deflector being arranged so that at least some of said particles bounce off said deflector onto a storage pile of said particles while at least a portion of the liquid from said particles runs downward between said spaced parallel elongated elements.

4. A process according to claim 3 wherein said wet particles fall onto a chute which is more steeply slanted than is said deflector and wherein the coke moves from said chute to fall upon said deflector.

5. Apparatus for the separation of liquids from solid particles wet with said liquids, said apparatus comprising in combination a deflector arranged at an angle to the horizontal and formed of parallel spaced elongated elements running along the slanted axis of said deflector, said parallel spaced elongated elements being sufficiently rigid and said deflector being arranged so that at least a portion of said solid particles bounce off said deflector onto a storage pile, and a source of said solid particles and said liquids from which said solid particles and liquids fall onto said deflector, together with means for collecting liquid and fine particles which move through said deflector between said elongated elements and elevated means for causing said solid particles to fall so as to impact against said deflector.

6. Apparatus according to claim 5 wherein said parallel spaced elongated elements are comprised of angle irons with their vertices arranged upward.

* * * * *